April 5, 1960 G. W. STODDARD 2,931,485
FORAGE BLOWER

Filed April 6, 1955 3 Sheets-Sheet 1

INVENTOR.
GLEN W. STODDARD
BY
Charles L. Lovercheck
attorney

April 5, 1960    G. W. STODDARD    2,931,485
FORAGE BLOWER

Filed April 6, 1955    3 Sheets-Sheet 2

INVENTOR.
GLEN W. STODDARD
BY
Charles L. Lovercheck
attorney

April 5, 1960 G. W. STODDARD 2,931,485
FORAGE BLOWER
Filed April 6, 1955 3 Sheets-Sheet 3

INVENTOR.
GLEN W. STODDARD
BY
Charles L. Lorenbech
attorney

United States Patent Office
2,931,485
Patented Apr. 5, 1960

2,931,485

FORAGE BLOWER

Glen W. Stoddard, Reinbeck, Iowa

Application April 6, 1955, Serial No. 499,569

1 Claim. (Cl. 198—174)

This invention relates to blowers and more particularly to blowers for blowing ensilage and other agricultural products.

This application constitutes an improvement over the blower disclosed in Patent No. 2,486,577, issued November 1, 1949.

In the said prior patent, a pneumatic hay stacker is disclosed which has removable wheels. In the present application, a hay blower is shown having means to let the blower rest on the ground without removing the wheels to lock them in operative position. It has further been discovered that by disposing the planks of the conveyor platform transversely rather than longitudinally, they are much less inclined to split and break. Further, the present application discloses an improved flight lifter to prevent the conveyor flights from catching on the ends of the conveyor platform. Where ensilage and other wet or green materials are conveyed, the hay is inclined to form a sticky mass with the material and to cause large bunches of the material to stick to a conveyor. In the present application, an improved conveyor flight is disclosed which will scrape off the material which adheres to the platform. Where large amounts of material are dumped onto the conveyor at one time, with the ordinary type of conveyor, the material is inclined to be fed into the blower at a more rapid rate than the blower can handle it efficiently. In the present application, there is disclosed a bunch breaker guard which limits the rate of feed of material into the blower and, therefore, keeps it operating at an optimum rate and serves as a safety feature.

It is, accordingly, an object of this invention to provide a blower which is simple in construction, economical to manufacture, and simple and efficient to use.

Another object of the invention is to provide a blower with a novel means for lifting the blower itself from the ground ready to be transported by wheels attached thereto.

Another object of the invention is to provide an improved platform structure in a blower.

A further object of the invention is to provide an improved flight construction for the conveyor of a blower.

A still further object of this invention is to provide an improved bunch breaker guard.

Another object of the invention is to provide an improved blade to stop back draft from the fan of a blower.

Still another object of this invention is to provide an improved flight lifter for the platform of a blower.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
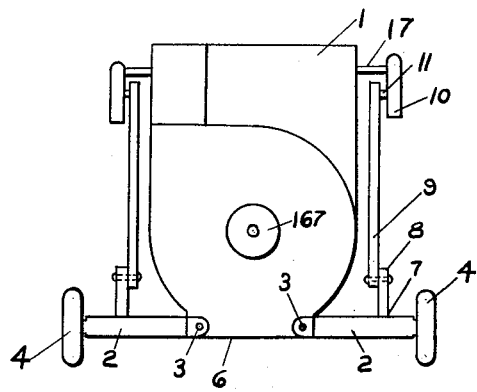
Fig. 1 is an end view of a blower according to the invention.

Now with more specific reference to the drawings, a blower 1 is shown supported on axles 2 which are pivoted to the body of the blower 1 at 3 and extend outwardly to receive ground engaging wheels 4. The purpose of the pivoted axles 2 is to allow the blower 1 to rest on the ground and thereby allow vehicles loaded with forage to drive over the platform when the blower 1 is to be used to blow forage into a silo, haymow, etc.

An intermediate point 7 of the axles 2 has an upwardly extending bracket 8 thereon which is pivotally attached to a link 9 at the lower end thereof and the upper end of link 9 is pivoted to a handle 10 by means of pivot pin 11. The handle 10 is adapted to be received in a socket 13 in the end of an extension handle 12 and the socket 13 is adapted to telescopically receive the end of the handle 10. The handle 10 may be forced to swing around a pivot 17 into parallel alignment with the link 9 and in engagement with a stop 14 which holds the handle 10 in alignment with the link 9. A latch 15 is adapted to swing into alignment with the stop 14, thereby holding the handle 10 in alignment with the link 9.

Figure 2:
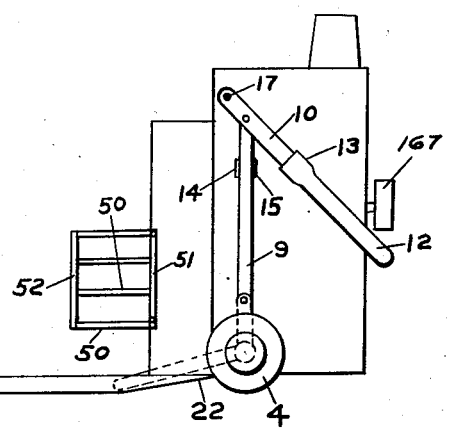
Fig. 2 is a side view of the blower shown in Fig. 1.
Figures 12, 13:
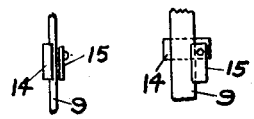
Fig. 12 is an edge view of the lifting mechanism locking device.
Fig. 13 is a side view of the device shown in Fig. 12.
Figure 3:
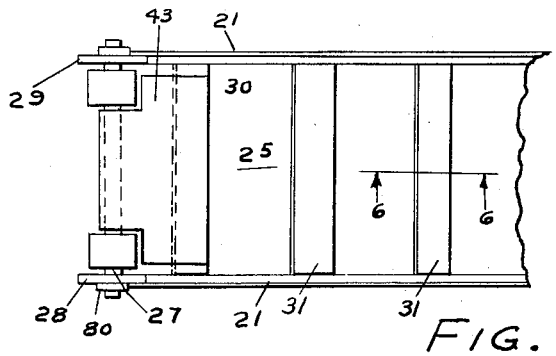
Fig. 3 is a top fragmentary view of the platform and conveyor.

It will be seen that when the handle 10 is in parallel relation with link 9 in the position shown in Fig. 1, the respective wheels 4 will be pushed downward into engagement with the ground and blower body 1 will be lifted and carried by the wheels 4. When it is desired to rest the platform 16 on the ground, the operator will release the handle 10 and allow the handle 10 to swing around the pivot 17 to the position shown in Fig. 2, thereby allowing the wheels 4 to swing around the pivots 3 and allowing the bottom of the blower 1 to rest on the ground. The platform 16 of the blower 1 is adapted to lie flat on the ground as shown in Fig. 2. When the wheels 4 are raised to the position shown in Fig. 1, the blower 1 is ready to be moved or transported by attaching a hitch 2a to a tractor truck or other motive vehicle.

Figure 4:
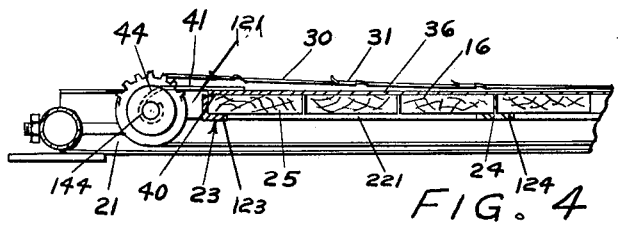
Fig. 4 is a longitudinal cross sectional view of the platform.

The platform 16 is made up of two spaced parallel longitudinally extending channel members 21 which have an angle iron 121 extending parallel and welded thereto. The channels 21 are welded to the body portion of the blower 1 at 22. A transverse angle iron 23 is longitudinally disposed between the angle members 121 and welded thereto at its ends and T-members 24 are spaced along the length of the conveyor and are welded on both of their ends to the longitudinal angle members 121. Planks 25 extend across the conveyor and rest at their ends on horizontal flanges 221 of the angle irons 121 and some of them rest at their sides on horizontal flanges 123 of angle 23 and on the flanges 124 of the T-members 24 as shown in Fig. 4. A sheet 36 of metal extends from end to end of the platform 16 and out of the edges of the side members 21 and forms a smooth platform for conveyor flights 31 to slide on and to urge the material along. By extending the plank members 25 across the conveyor, a loaded vehicle can be driven over the conveyor without the danger of breaking or splitting the planks 25 which would result if they were extended longitudinally. By extending the planks 25 laterally with the grain thereof running transversely as shown instead of longitudinally, the wheels of loaded wagons driving over the conveyor are not inclined to split the planks 25 and a much more compact design results.

In the end of the longitudinal members 21 remotest from the blower 1, bearings 80 are disposed to carry a shaft 27 which has sprockets 28 and 29 fixed to the ends thereof and chains 30 running on the sprockets 29. Between the chains 30 are disposed the flights 31. The flights 31 have a chain link 32 at either end thereof which are connected at spaced intervals in the chains 30. The flights 31 have an intermediate portion 33 which extends generally parallel to the top surface of the platform 16. The front edges 34 of the flights 31 are bent downward toward the platform 16 and the leading edge 35 is adapted to slide on the conveyor platform 16 and over the metal sheet 36 which covers the platform 16. A rear portion 82 of the flights 31 is bent upwardly at 83 and assists the other portions of the flights 31 in dragging material toward the blower 1. In the handling of green ensilage, the sap from the ensilage is inclined to cause bunches of material to adhere to the platform 16 and the leading edge 35 of the flights 31 will scrape this accumulation of material off of the platform 16, thereby providing a clean working surface.

The flights 31 are lifted as they come around the end of the conveyor remote from the blower 1 and are prevented from catching on a corner 40 by a flight lifter 41. The lifter 41 is made up of a plate 43. The flight lifter 41 is bent upward and toward the blower 1 at 44 and the end thereof remote from the blower 1 is bent at 144 to form an eye which receives the shaft 27 and is supported thereby. As the flights 31 move around with the conveyor chain 30, they are guided upward and over the end and corner 40 of the conveyor as they advance toward the blower 1.

Figure 5:
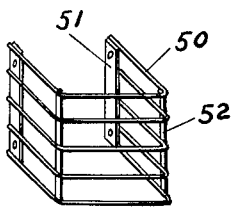
Fig. 5 is a perspective view of the bunch breaker guard.
Figure 6:
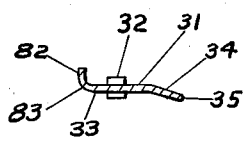
Fig. 6 is an enlarged cross sectional view of the flights of the conveyor taken on line 6—6 of Fig. 3.
Figure 7:
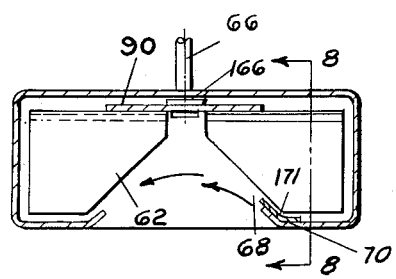
Fig. 7 is a cross sectional view taken on line 7—7 of Fig. 9.
Figure 8:
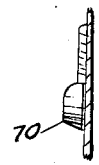
Fig. 8 is a cross sectional view taken on line 8—8 of Fig. 7.
Figure 9:
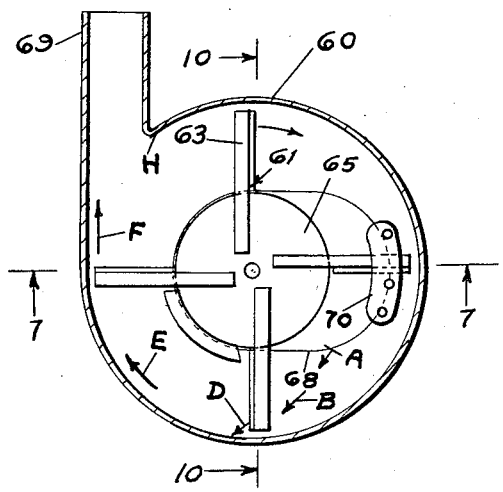
Fig. 9 is a cross sectional view taken on line 9—9 of Fig. 10.
Figure 10:
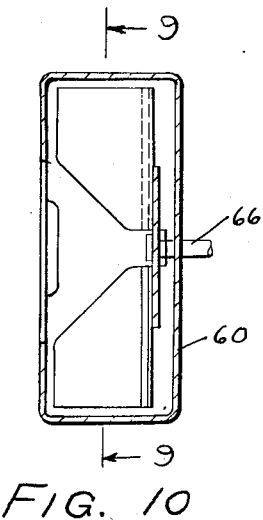
Fig. 10 is a cross sectional view taken on line 10—10 of Fig. 9.

The bunch breaker guard which is shown in Fig. 5 constitutes both a means for preventing large amounts of material from entering the blower 1 simultaneously and also acts as a safety feature to prevent injury to personnel. In assembled position in the machine, the guard is shown in Fig. 2 and is adapted to restrain large bunches of ensilage or chopped hay from entering the blower 1 at once and, thereby, tending to clog the blower 1 or to lower the efficiency thereof. The bunch breaker guard limits the size of a bunch of material which can be moved into the blower 1 and makes it possible to deposit a large amount of ensilage or chopped hay on the conveyor; that is, an entire load may be dumped on the conveyor at once and fed in by the conveyor without lowering the efficiency of the blower 1. The bunch breaker guard is made up of vertically spaced slats 50 which are welded to end members 51 and held in spaced relation by vertical corner members 52 which are attached to the spaced members 50. The guard is manufactured by starting with the rods, bars, or slats 50 being straight, then welding the straight rods or bars 50 to the members 51, and then bending them simultaneously to form the shape of the bunch breakers shown. The end members 51 are then attached to the side of the blower 1 as shown in Fig. 2 and they limit the size of bunches of material which can be drawn into the blower 1 at one time.

The blower member 1 itself is shown in detail in Figs. 7 to 10. The blower 1 is made up of a housing 60 which contains an impeller 61. The impeller 61 is made up of blades 62 which may be flat plate like members welded to an angle iron 63. One leg of the angle 63 is welded to the plate 90 and the other leg is welded to a disk member 65 which is in turn attached to a shaft 66 at 166. The shaft 66 is driven by a pulley 167 driven through a belt, chain, or gearing by an electric motor or other motive power. The impeller 61 draws air through an opening 68 in the front of the housing 60 and drives the forage, chopped hay, or ensilage through a discharge 69 which may be attached to a pipe line for conveying the forage into a barn loft, haymow, silo, or the like. A deflector plate or back draft plate 70 is attached to the front of the blower housing 60 at 171 adjacent the lower portion of the opening 68 which directs the air from the blower 1 into the channel between the impeller blades 62 and prevents a back draft. The deflector plate 70 is a curved shaped plate which bends inward into the space between the blades 62 and, therefore, directs the flow of air up into the blower 1. When the deflector plate 70 is used, very little dust is present around the blower 1 since the dust is drawn into the blower 1 and the blower 1 acts as an exhaust means to remove any dust from around it.

The opening 68 is in the shape of an elongated circle having the longest axis disposed horizontally and the opening 68 offset in a direction away from the outlet so that material fed into the blower 1 is fed into the opening 68 at A and follows the path indicated by the arrow B so that it reaches the bottom of the blower 1 approximately at D where it begins to frictionally engage the inside periphery of the blower 1 and continues to be driven therearound by the blades 62 to F where centrifugal force causes the material to leave the blades 62 and the inertia of the mass of forage carries it up the discharge 69 and it is continued to be urged through a pipe connected thereto by air pressure and force of the material therebelow from the blower 1. The back draft deflector 70 deflects air back from the opening so that material introduced to the blower 1 at A will not be caught in a back draft and be blown back out of the opening toward the operator. It will be noted that the friction of material on the inside periphery of the blower body starts at D and ends as the material is driven up to discharge 69. Therefore, considerable friction is eliminated and power consumption for driving the machinery is reduced since the friction of the material thereon does not begin at H but begins at D and ends just before H. Back draft is practically eliminated as a result of the specific design disclosed and very little dust is present around the blower since the blower acts as a ventilating system carrying all dust away rather than driving dust back from the blower as is the case with many forage blowers which are now in use.

Figure 11:
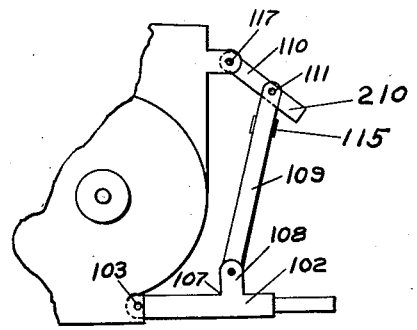
Fig. 11 is a view of another embodiment of the lift mechanism.

In Fig. 11, another embodiment of the invention is shown where an axle 102 is pivoted to the blower 1 at 103 and has a bracket 108 integrally attached thereto at 107. Link 109 extends upwardly and is pivotally connected to handle 110 at 111. Handle 110 is pivoted to the blower body 1 at 117. Therefore, when it is desired to lift the machine, a handle extension is attached to the end 210 of the member 110 and the member 110 is rotated around the pivot 117 into alignment with the link 109 and locked in alignment with the link 109 by means of a locking device 115.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

A conveyor for use on a blower for forage, said conveyor having a platform comprising spaced parallel, longitudinally extending channel members having the flanges thereof extending toward each other, longitudinally extending angle irons attached to said channel members and extending parallel thereto with one leg of each said angle iron extending toward the other said angle iron, a transverse angle iron having its ends attached to one said longitudinally extending angle iron at each of its ends, spaced T-members each having one end attached to one said longitudinally extending angle iron, one leg of each said longitudinally extending angle iron, one leg of said transverse angle iron, and a flange of each said T-member all being disposed in a common plane and each presenting an upwardly facing surface to receive a floor plank, floor planks having their ends supported on said longitudinally extending angle legs, some of the side edges of said floor planks being supported on said transverse angle legs and some side edges of said floor planks being supported on said flanges of said T-members and the side edge of said plank being supported on the horizontal flange of said transverse angle iron, an axle supported between said channel members, a sprocket member on said axle, a chain on said sprocket, transversely disposed flights attached to said chain and slidable over said planks of said platform, a roller member mounted on said axle at the end of said conveyor spaced from said planks, and a flight lifter comprising a plate having one end thereof bent in the form of an eye, said eye receiving said axle, the other end of said flight lifter extending upwardly and parallel to the top surfaces of said planks and the end of said flight lifter remote from said eye resting on the planks of said conveyor, said chain being disposed continuously around said sprocket and being freely slidable over said flight lifter and over said planks.

References Cited in the file of this patent
UNITED STATES PATENTS

| | | |
|---|---|---|
| 1,893,710 | Lykken | Jan. 10, 1933 |
| 1,900,213 | Wenberg | Mar. 7, 1933 |
| 2,343,714 | Swenson | Mar. 7, 1944 |
| 2,464,973 | Freiden | Mar. 22, 1949 |
| 2,486,577 | Stoddard | Nov. 1, 1949 |
| 2,588,711 | Everett | Mar. 11, 1952 |
| 2,644,723 | Johnston | July 7, 1953 |
| 2,695,816 | McClellan | Nov. 30, 1954 |
| 2,698,770 | Van Sickle | Jan. 4, 1955 |
| 2,712,412 | West | July 5, 1955 |
| 2,718,296 | Johnson | Sept. 20, 1955 |